US010929326B2

(12) United States Patent
Compton et al.

(10) Patent No.: US 10,929,326 B2
(45) Date of Patent: Feb. 23, 2021

(54) FIRM CHANNEL PATHS

(71) Applicant: International Business Machines Corporation, Armonk, NY (US)

(72) Inventors: Scott B. Compton, Poughkeepsie, NY (US); Dale F. Riedy, Poughkeepsie, NY (US); William J. Rooney, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 15/268,683

(22) Filed: Sep. 19, 2016

(65) Prior Publication Data

US 2018/0081846 A1 Mar. 22, 2018

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01)

(58) Field of Classification Search
CPC .................. G06F 13/4221; G06F 13/4027
USPC ............ 710/10, 17, 18, 33, 36, 38, 104, 107
See application file for complete search history.

(56) References Cited

U.S. PATENT DOCUMENTS

| | | | |
|---|---|---|---|
| 4,484,357 A * | 11/1984 | Fedde | H03J 1/0091 455/166.2 |
| 5,257,379 A | 10/1993 | Cwiakala et al. | |
| 5,301,323 A | 4/1994 | Maeurer et al. | |
| 6,012,104 A | 1/2000 | Van Nguyen et al. | |
| 6,519,660 B1 | 2/2003 | Rooney | |
| 6,647,515 B1 | 11/2003 | Hefferon et al. | |
| 6,766,164 B1 * | 7/2004 | Funk | H04B 17/0085 379/21 |
| 6,785,747 B2 | 8/2004 | Lehmann et al. | |
| 6,816,927 B2 * | 11/2004 | Bouchet | G06F 9/46 709/221 |
| 6,986,137 B1 * | 1/2006 | King | G06F 9/5077 709/220 |
| 7,130,938 B2 | 10/2006 | Brice, Jr. et al. | |
| 7,568,052 B1 * | 7/2009 | Cwiakala | G06F 9/5011 710/38 |
| 8,244,924 B2 | 8/2012 | Butler et al. | |
| 8,601,542 B1 * | 12/2013 | Eatough | G06F 9/44505 726/3 |
| 9,703,649 B2 * | 7/2017 | Winokur | G06F 11/2005 |
| 9,722,928 B2 * | 8/2017 | Patel | G01V 1/28 |

(Continued)

OTHER PUBLICATIONS

R. Cwiakala & P.G. Greenstein; Dynamic Channel Path Addition Process, vol. 36, No. 05; May 1, 1993; 3 pages.

*Primary Examiner* — Farley Abad
*Assistant Examiner* — Henry W Yu
(74) *Attorney, Agent, or Firm* — Cantor Colburn LLP; Teddi Maranzano

(57) ABSTRACT

A system and method of implementing a firm channel in a computer system are provided. The method including identifying at least one of a channel and a channel path ID (CHPID) as a first firm channel, automatically defining a logical path between a first device and a second device using the first firm channel, and storing the logical path in a configuration file of the computer system, wherein the logical path is accessible at system initialization.

18 Claims, 7 Drawing Sheets

(56) References Cited

U.S. PATENT DOCUMENTS

| | | | | |
|---|---|---|---|---|
| 2003/0065835 A1* | 4/2003 | Maergner | ............. | G06F 9/5027 710/61 |
| 2008/0049781 A1* | 2/2008 | Bugenhagen | ....... | H04L 12/5692 370/465 |
| 2010/0138873 A1* | 6/2010 | Terada | ................. | H04N 21/472 725/56 |
| 2010/0177641 A1* | 7/2010 | Farkas | ................ | H04L 41/0677 370/242 |
| 2011/0039579 A1* | 2/2011 | Karjalainen | ............ | H04W 4/02 455/456.1 |
| 2014/0086079 A1* | 3/2014 | Das | .................... | H04B 17/3911 370/252 |
| 2016/0134472 A1* | 5/2016 | Guan | ................. | H04L 41/0806 709/222 |
| 2017/0235503 A1* | 8/2017 | Karr | ..................... | G06F 3/0619 711/114 |
| 2018/0332630 A1* | 11/2018 | Gorajala Chandra | ....................... | H04W 48/10 |

* cited by examiner

FIRM CHANNEL PATHS

BACKGROUND

The subject matter disclosed herein generally relates to data channels and, more particularly, to defining the properties and functionality of a data channel.

There are currently two types of channel-paths; static channel-paths and dynamic channel-paths. Static channel-paths are channel paths that have traditionally been defined explicitly by a client/user, and therefore cannot be reassigned by the system and/or system software, for example, the system's operating system (OS), that is using the static channels. Static channels are also explicitly defined in a configuration file, for example, input/output definitions file (IODF) and/or input/output configuration data sets (IOCDS). By being provided in the configuration file a static channel has access to I/O devices when the systems is first started, for example when the system is started with an initial-microprogram load (IML).

In contrast, dynamic channel-paths are channel paths that are defined by the system, using for example dynamic channel-path management (DCM), and therefore may be dynamically reconfigured at the discretion of the system. Because dynamic channels-paths are assigned by the system, the configuration file does not have these channels assigned to any control units and therefore they are not available during early system initialization. They are instead available later in system initialization when the controlling software, for example DCM, becomes available.

Therefore in order to initialize a system using, for example, an initial program load (IPL), either a client/user or the system's OS defines at least one or more of the available channel paths in a system as static. These static channel paths stored in the configuration file allow the system access to devices it needs in order to be started. This permanently locks the channels in place regardless of future system conditions such as bandwidth requirements or system architecture/arrangement.

Accordingly, there is a desire for improved channel properties and functionality beyond those currently available.

BRIEF DESCRIPTION

According to one embodiment a method of implementing a firm channel in a computer system is provided. The method including identifying at least one of a channel and a channel path ID (CHPID) as a first firm channel, automatically defining a logical path between a first device and a second device using the first firm channel, and storing the logical path in a configuration file of the computer system, wherein the logical path is accessible at system initialization.

In addition to one or more of the features described above, or as an alternative, further embodiments may include wherein automatically defining the logical path between the first device and the second device using at least one of the first device and the second device includes selecting the first firm channel between the first device and the second device, selecting the logical path based on at least one of logical path properties and channel attributes, wherein logical path properties include one or more of bandwidth allocation, communication scheme, security scheme, password protection, and end user identification information, and wherein channel attributes include one or more of static, dynamic, and firm, combining the selected the first firm channel, logical path properties, and channel attributes to form a channel configuration, and forming the logical path based on the channel configuration.

In addition to one or more of the features described above, or as an alternative, further embodiments may include identifying a plurality of channels each defined by a channel attribute in an I/O configuration file, wherein each of the plurality of channels provide a path from the first device to the second device, and wherein the channel attribute is at least one of static, dynamic, and firm, selecting a logical path between the first device and the second device by selecting one of the plurality of channels that has a channel attribute of firm, and storing the logical path associated with the selected channel from the plurality of channels in the I/O configuration file when the channel attribute is firm.

In addition to one or more of the features described above, or as an alternative, further embodiments may include wherein the first device is a host device, and wherein the second device is a storage controller.

In addition to one or more of the features described above, or as an alternative, further embodiments may include collecting logical path properties from at least one of the first device and the second device, modifying the logical path based on the logical path properties, and storing the modified logical path in the configuration file.

In addition to one or more of the features described above, or as an alternative, further embodiments may include reassigning the firm channel by the computer system in response to shifting workload patterns.

In addition to one or more of the features described above, or as an alternative, further embodiments may include wherein logical path properties include one or more of bandwidth allocation, communication scheme, security scheme, password protection, end user identification information, architecture, architecture adjustments, architecture limitations, switch availability, and workload patterns, wherein the method further includes considering the amount of bandwidth allocation when selecting the first firm channel and the logical path, considering the architectural limitations when selecting the first firm channel and the logical path, and considering the switch availability when selecting the first firm channel and the logical path such that a different switch is selected if a current switch is already in use for connecting the first device and the second device.

In addition to one or more of the features described above, or as an alternative, further embodiments may include wherein the first device and the second device are each selected from a group consisting of a host and a storage controller, and wherein architecture adjustments include one or more of an addition of a host, addition of a switch, addition of a storage controller, removal of a host, removal of a switch, removal of a storage controller, removal of a logical path, removal of a channel, rearrangement of a host, rearrangement of a switch, rearrangement of a storage controller, replacement of a host, replacement of a switch, and replacement of a storage controller.

In addition to one or more of the features described above, or as an alternative, further embodiments may include automatically discovering the second device, wherein the second device is a storage controller, proposing a firm channel configuration to a user, receiving a user feedback to the proposed firm channel configuration, adjusting the proposed firm channel configuration based on the user feedback, modifying the logical I/O configuration based on the proposed firm channel configuration, and storing the logical I/O configuration as modified back into the configuration file of the system.

In addition to one or more of the features described above, or as an alternative, further embodiments may include generating a plurality of firm channels, wherein the plurality of firm channels include channel attributes, and storing one or more channels from the plurality of firm channels in the configuration file of the computer system that have a channel attribute of firm, wherein the one or more channels are accessible at system initialization.

In addition to one or more of the features described above, or as an alternative, further embodiments may include collecting channel attributes for the plurality of firm channels, and modifying the plurality of channels based on the channel attributes of the plurality of channels.

In addition to one or more of the features described above, or as an alternative, further embodiments may include, wherein modifying the logical path based on logical path properties includes confirming one or more modification requirements are met prior to modifying the logical path.

In addition to one or more of the features described above, or as an alternative, further embodiments may include wherein the one or more modification requirements includes one or more of an allotted time having passed since previous modification, a confirmation that available dynamic channels were first modified to adjust for the logical path properties received.

In addition to one or more of the features described above, or as an alternative, further embodiments may include periodic rebalancing of channel configuration of the firm channel, wherein the periodic rebalancing is done at an interval of one selected from a group consisting of hours, days, and months.

In addition to one or more of the features described above, or as an alternative, further embodiments may include retrieving the firm channel from the configuration file at system startup.

According to one embodiment computer system that includes a firm channel is provided. The system including a first device that is connected to a second device through a plurality of network resources that include one or more switches and links, wherein the links are selected from one or more of a fiber optic cable, a wireless communication system, an Ethernet cable, and a coaxial cable, and a firm channel that includes a logical path from the first device to the second device through some of the plurality of network resources, wherein the logical path can be changed by the computer system automatically, and wherein at least one of the logical path and the firm channel is stored back into a configuration file.

In addition to one or more of the features described above, or as an alternative, further embodiments may include wherein the configuration file is at least one or both selected from a group consisting of an input/output definition file (IODF), and input/output configuration data sets (IOCDS).

In addition to one or more of the features described above, or as an alternative, further embodiments may include wherein the first device is a host, and wherein the second device is a storage controller.

According to one embodiment computer program product to implement a firm channel in a computer system is provided. The computer program product including a computer readable storage medium having program instructions embodied therewith, the program instructions executable by a processor to cause the processor to identify at least one of a channel and a channel path ID (CHPID) as a first firm channel, automatically define a logical path between a first device and a second device using the first firm channel, and store the logical path in a configuration file of the computer system, wherein the logical path is accessible at system initialization.

In addition to one or more of the features described above, or as an alternative, further embodiments may include additional program instructions embodied therewith, the additional program instructions executable by a processor to cause the processor to identify a plurality of channels each defined by a channel attribute in an I/O configuration file, wherein each of the plurality of channels provide a path from the first device to the second device, and wherein the channel attribute is at least one of static, dynamic, and firm, select a logical path between the first device and the second device by selecting one of the plurality of channels that has a channel attribute of firm, and store the logical path associated with the selected channel from the plurality of channels in the I/O configuration file when the channel attribute is firm.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
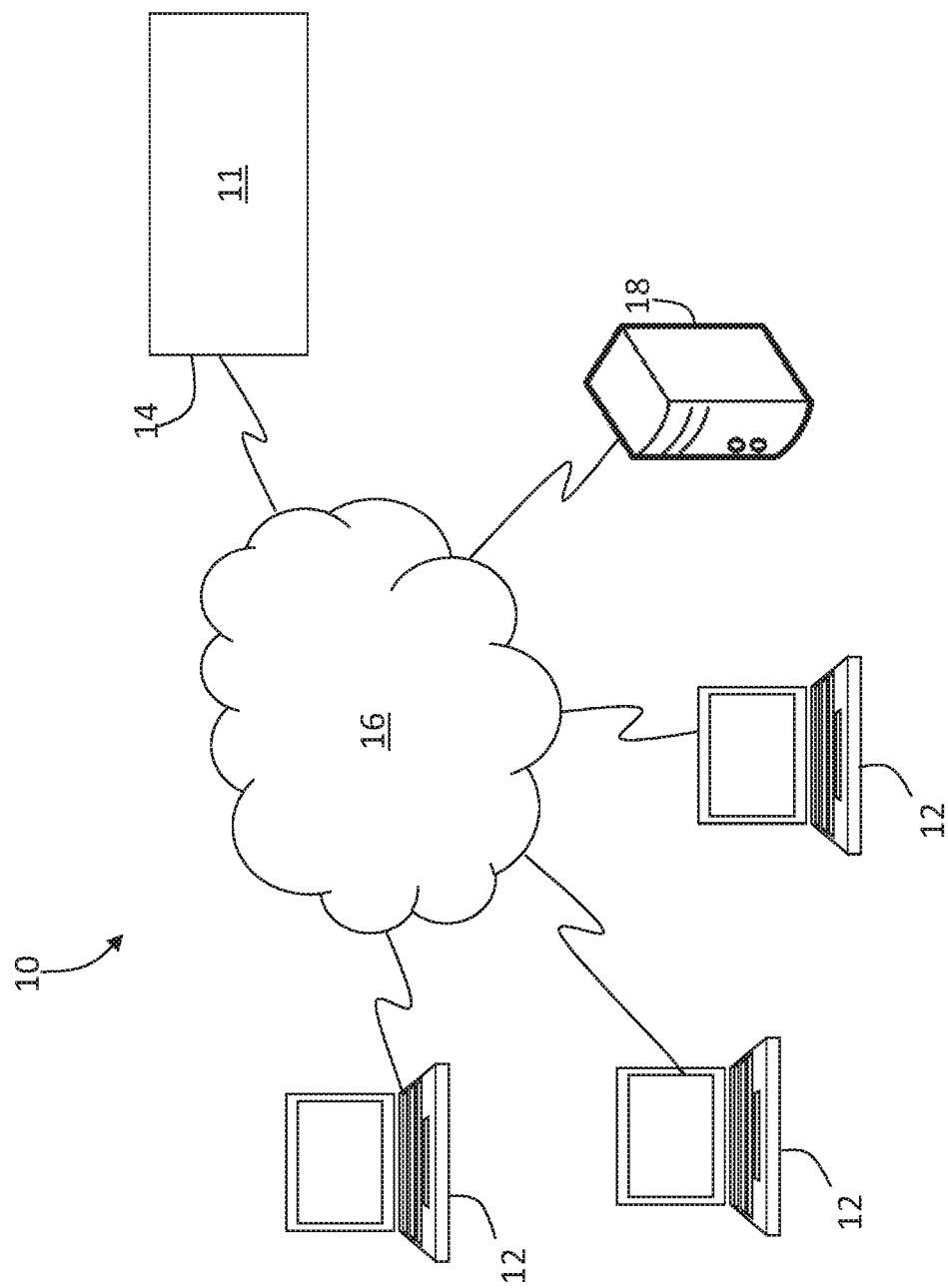
FIG. 1 is a block diagram of a networked system for enabling communication between devices that make up the networked system for practice of the teachings herein in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a new channel type that is available during IPL so that a system can be started, that can also be reassigned by the system, in response to, for example, shifting workload patterns. A channel generated having these properties and functionality of this new channel type is called a "firm" channel path.

As noted above, a static channel is a channel that it is defined by the client, is part of the configuration file (such as an IODF and/or IOCDS file) and cannot be changed or modified. A dynamic channel is a channel that it is defined by the system (using for example DCM), has no specific definition in the configuration file assigning it to any control unit, and may be changed and modified and therefore is not useable for system initialization/start-up (for example IPL after an IML). In contrast to both, a firm channel is stored in the configuration file so it can be used at system initialization/start-up and is also configurable by the system based on one or more system properties or user inputs.

According to one or more embodiments, a firm channel is not selected by a user/client but rather by the system, using for example DCM in harmony with the operating system and other system software, for example z/OS Discover and Autoconfigure (zDAC). Further, in accordance with one or more embodiments, a firm channel can be reconfigured or reassigned, in part because it is a channel which was not explicitly configured by the client.

DCM is a capability designed to dynamically adjust a channel configuration in response to shifting workload patterns. DCM is also documented in patent "Method, System and Program Products for Managing I/O Configurations of a Computing Environment" granted to International Business Machines Corporation, July 2009 (U.S. Pat. No. 7,568, 052), which is hereby included by reference.

zDAC provides automatic discovery of storage controllers, and can also propose a configuration for the client. The client can then decide to select the recommendation from zDAC, or make modifications and then save it. zDAC assigns channel paths to control units with no knowledge of the expected or actual bandwidth requirements of the control units. zDAC is also documented in patent "Discovery and Configuration of Device Configurations" granted to International Business Machines Corporation, August 2012 (U.S. Pat. No. 8,244,924 B2), which is hereby included by reference.

Further, in accordance with one or more embodiments, once a firm channel has been assigned, the corresponding change will be made in the configuration file, such as an IOCDS and/or IODF file, so that if a reIML of the processor is necessary it will be able to use the firm channels to IPL.

In accordance with one or more other embodiments, a firm channel can be "sticky" when viewed by DCM. What is meant by "sticky" is that firm channels are rather static in their assignment as compared to a dynamic channel. Particularly, the firm channel can be required to meet an additional metric before it can be adjusted or changed. For example, a firm channel may only be reassigned when movement of the dynamic channels is insufficient to allow workload to achieve its goals. According to another example, the firm channel may be limited by a select time interval as to how often it can be reassigned or configured or even how often it is considered for reassignment or reconfiguration. For example, a time interval of a few minutes, hours, days or even months could be implemented to provide the "sticky" feature of the firm channel. This feature provides for the configuration file to therefore not be modified as frequently as compared to dynamic channels that are DCM modified in the channel subsystem. In addition, it reduces the overhead of managing the firm channels.

According to one or more embodiments, the system can generate and propose a configuration for one or more firm channels to a client/user. According to one or more embodiments, management of firm channels would be done by the system without human (i.e. client/user) intervention. The client can then accept or reject one or more of the firm channels and the system will store or adjust/modify the configuration of the firm channels in the configuration file. As such, because the firm channel is a channel which was not explicitly configured by the client it can be reconfigured or reassigned. For example, according to other embodiments, once the firm channels are accepted or rejected, these firm channels can still be adjusted and changed by the system over time depending on the system conditions.

Turning now to FIG. 1, a block diagram of a networked system 10 for enabling communication between devices that make up the networked system 10 for practice of the teachings herein is shown in accordance with one or more embodiments of the present disclosure. The system 10 includes channel control application, hereinafter channel control system 11, for performing the processing described herein that is executed by one or more computer programs located on a host system 14 and/or a user system(s) 12.

The system 10 depicted in FIG. 1 includes one or more user systems 12 through which users, e.g., SMEs and other persons, at one or more geographic locations may contact the host system 14 to initiate programs and/or participate in the channel control system 11. The user systems 12 are coupled to the host system 14 via a network 16. Each user system 12 may be implemented using a general-purpose computer executing a computer program for carrying out the processes described herein. The user systems 12 may be user devices such as personal computers (e.g., a laptop, a tablet computer, a cellular telephone, etc.) or host attached terminals. If the user systems 12 are personal computers, in some embodiments, the processing described herein may be shared by a user system 12 and the host system 14. The user systems 12 may also include game consoles, network management devices, and field programmable gate arrays. In addition, multiple user systems 12 and/or host systems 14 may be concurrently operating.

The network 16 may be any type of known network including, but not limited to, a wide area network (WAN), a local area network (LAN), a global network (e.g. Internet), a virtual private network (VPN), a cloud network, and an intranet. The network 16 may be implemented using a wireless network or any kind of physical network implementation known in the art. A user system 12 may be coupled to the host system through multiple networks 16 (e.g., cellular and Internet) so that not all user systems 12 are coupled to the host system 14 through the same network 16. One or more of the user systems 12 and the host system 14 may be connected to the network 16 in a wireless fashion. In one non-limiting embodiment, the network is the Internet and one or more user systems 12 execute a user interface application (e.g. a web browser) to contact the host system 14 through the network 16. In another non-limiting example embodiment, the user system 12 is connected directly (i.e., not through the network 106) to the host system 14. In a further non-limiting embodiment, the host system 14 is connected directly to or contains a storage device 18. The network 16 may be employed by the channel control system 11 such that the channel control system 11 may communicate with one or more resources, either directly or indirectly.

The storage device 18 includes data relating to the channel control system 11 and/or data relating to data channel control and generation. In some embodiments, the storage device 18 may be implemented using a variety of devices for storing electronic information. In an example embodiment, data stored in the storage device 18 includes, but is not limited to, channel properties and functionality, and other data utilized by embodiments described herein. It is understood that the storage device 18 may be implemented using memory contained in the host system 14 or that it may be a separate physical device. The storage device 18 may be logically addressable as a consolidated data source across a distributed environment that includes the network 16. Information stored in the storage device 18 may be retrieved and manipulated via the host system 14 and/or via a user system 12.

The host system 14 depicted in FIG. 1 may be implemented using one or more servers operating in response to a computer program stored in a storage medium accessible by the server. The host system 14 may operate as a network server (e.g., a web server) to communicate with the user system 12. The host system 14 handles sending and receiving information to and from the user system 12 using the defined channels and can perform associated tasks. The host system 14 may also include a firewall to prevent unauthorized access to the host system 14 and enforce any limitations on authorized access, e.g., permitting only designated SMEs and/or other authorized persons to access the channel control system 11. For instance, an administrator may have access to the entire system and have authority to modify portions of the system and/or permissions thereto. A firewall may be implemented using conventional hardware and/or software as is known in the art.

The host system 14 may also operate as an application server. The host system 14, in such embodiments, may execute one or more computer programs, including the channel control system 11, to provide aspects of embodiments as described herein. Processing may be shared by the user system 12 and the host system 14 by providing an application to the user system 12. Alternatively, the user system 12 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

During a collaborative effort, one or more users, e.g., SMEs and other persons, may use a user system 12 to communicate through the network 16 and participate in a discussion on the host system 14 employing the channel control system 11. In some embodiments, users or groups of users may be divided into different groups and/or threads that are carried out in parallel. Further, during a collaborative effort, one or more users may instruct the channel control system 11 and/or the host system 14 to generate and maintain channels for communicating with one or more resources over the network 16.

Figure 2:
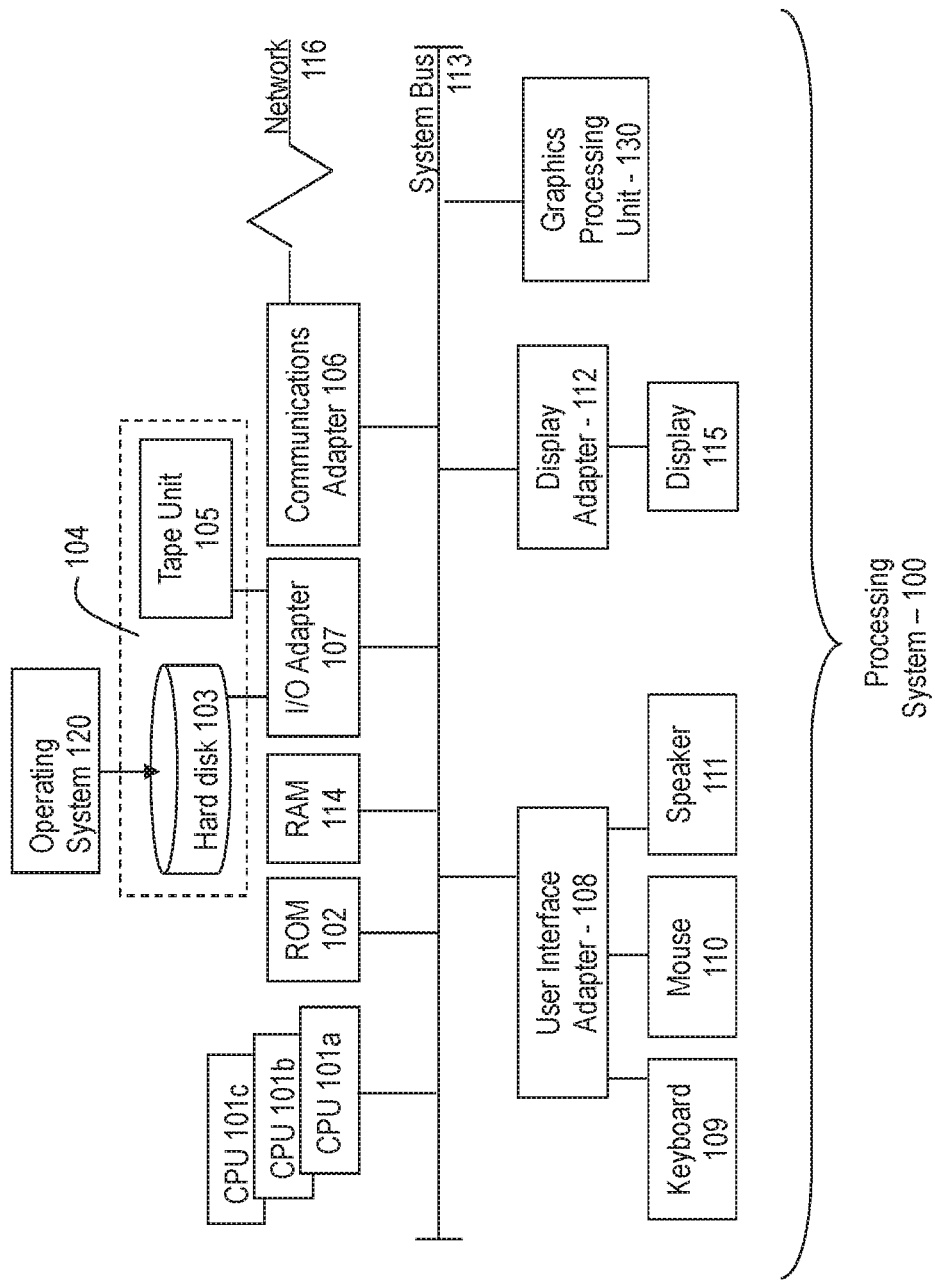
FIG. 2 is a block diagram illustrating one example of a device such as those shown in FIG. 1 for practice of the teachings herein in accordance with one or more embodiments of the present disclosure.

Turning to FIG. 2, a block diagram illustrating one example of a device, such as a host system 14, user system 12, and/or storage device 18 as shown in FIG. 1, for practice of the teachings herein is shown in accordance with one or more embodiments. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 2 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 2, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 2.

Figure 3A:
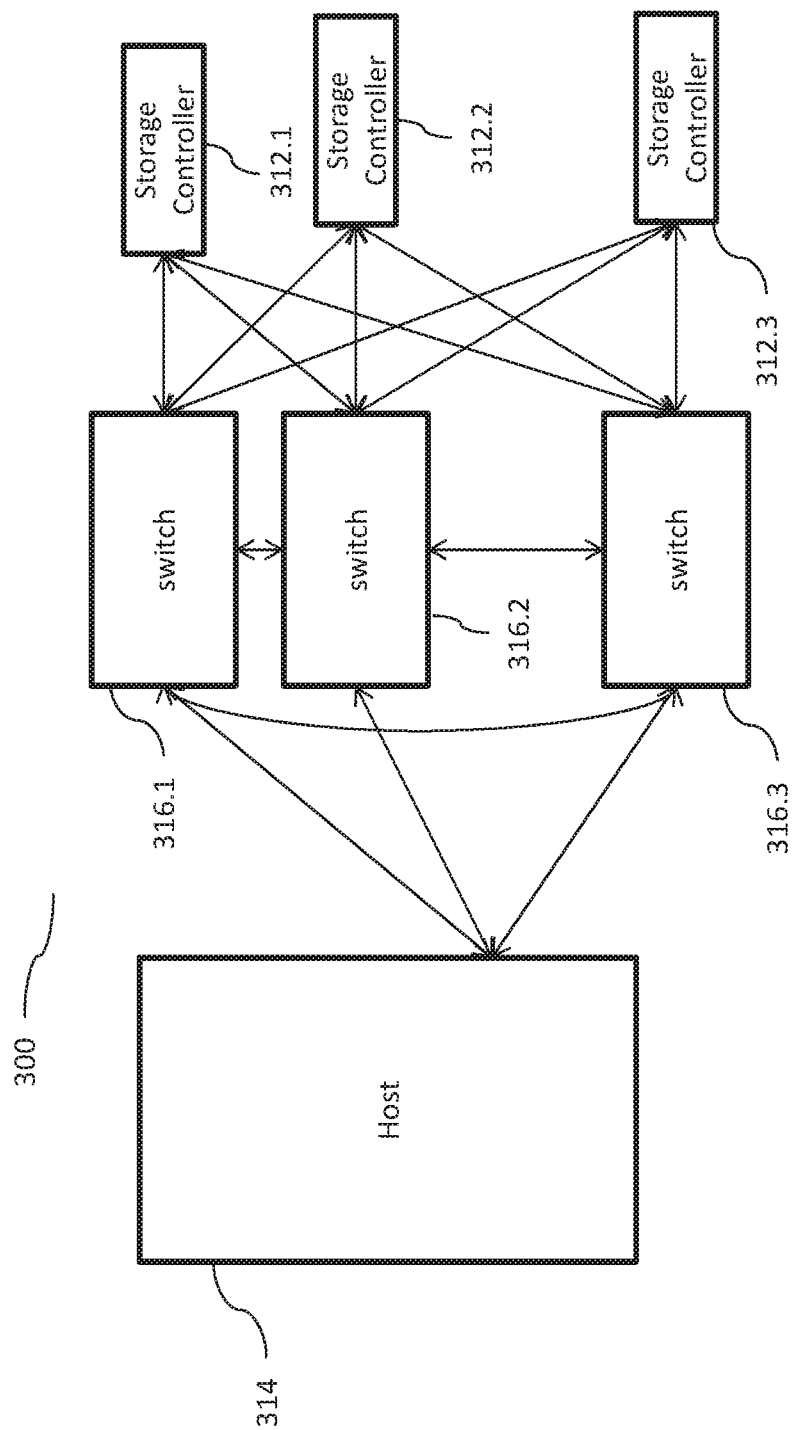
FIG. 3A is a block diagram of a system for practice of the teaching herein in accordance with one or more embodiments of the present disclosure.

FIG. 3A is a block diagram of another system 300 for practice of the teaching herein in accordance with one or more embodiments of the present disclosure. The system 300 includes a host 314 that is connected to storage controllers 312.1, 312.2, and 312.3. The host 314 is connected to the storage controllers 312.1, 312.2, and 312.3 using switches 316.1, 316.2, and 316.3. As shown, the host 314 is connected to each switch 316.1, 316.2, and 316.3. This connection can be made using a fiber optic cable, a wireless communication system, or any other communication mechanism as discussed above. Further, each switch 316.1, 316.2, and 316.3 are connected to each other as well as to each storage controller 312.1, 312.2, and 312.3. Accordingly, there are a plurality of different path options from the host 314 to any one or more of the storage controllers 312.1, 312.2, and 312.3.

According to one or more embodiments, the host has several channels, which are ports where a cable can be plugged, much like the Ethernet port on a computer or laptop. A typical host could have dozens of such ports. As shown in FIG. 3A it would appear that there is one port (with three cables plugged into it) however, according to one or more embodiments, this connection point include a plurality of ports.

Similarly, the switches, which would be like an Ethernet router or switch at home, will also include a plurality of ports. For example, the switches can have dozens of ports, which can then be plugged into channels (hosts), host adapters (storage controllers), or other switches. Accordingly, the host, switches, and storage controller all can each have many ports.

According to one or more embodiments, the connections that are provided between the switches are inter-switch links (ISL). Further, according to one or more embodiments, in the case were ISLs are used as well, a table used to define paths would include CHPID, SWITCH Number, and Exit Port, instead of just CHPID and Exit port.

Figure 6:
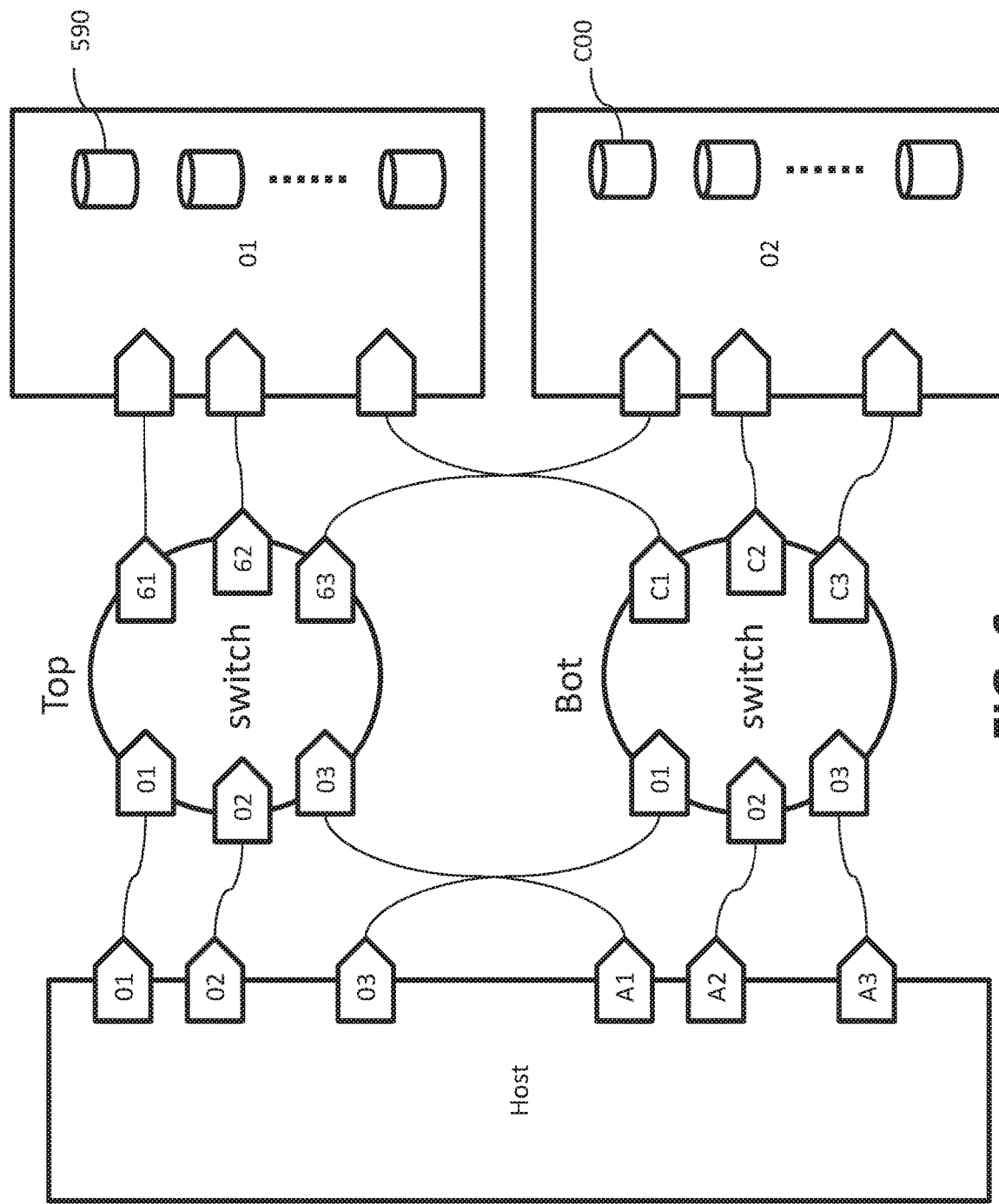
FIG. 6 is a block diagram of a plurality of ports that provide a plurality of physical cabling paths from a host, through a switch, to a storage controller in accordance with one or more embodiments of the present disclosure.

For example, as shown in FIG. 6, a plurality of ports is shown that provide a plurality of physical cabling paths from a host, through a switch, to a storage controller. In accordance with one or more embodiments, the physical cabling cannot be modified and rather only the "logical pathing" is changed in accordance with one or more embodiments. Specifically, turning now to FIG. 6 two paths to device 590 in storage controller 01 can be provided. Particularly, one uses channel (or channel path ID (CHPID)) 01, goes to the top switch and out its port 61. The second path goes through CHPID A3 to the bottom switch to port C1.

Further, two paths to device C00 in storage controller 02 can be provided. Particularly, to get to device C00, channel path ID (CHPID) 03 is used to Switch Bot which connects to port C2. The second path goes through CHIPD A2 to Switch Bot to port C3.

Now, in one example in accordance with one or more embodiments, device C00 may need additional bandwidth. A third path can be defined to device C00 using CHPID 02, to switch Top, to port 63. This third path was always physical there, it was just not "logically defined" (i.e. known), and therefore was unavailable.

Further, each path may have different bandwidth and transmission capabilities based on the location of each element as well as to the physical underlying device that is functioning as any one of the devices. For example, switch 316.1 could be located at a remote location away from all the other elements in the system 300 that can be located within a single facility. Alternatively, storage controller 312.1 and the storage it controls could be the element that is located at a remote location away from other elements of the system 300. According to another embodiment, all the elements could be remotely located at different geographic locations. This would provide for different transmission properties for each. Going back to the first example of a remote switch 316.1, the switch 316.1 being at a remote location may be provided with a weak wireless connection or a wired connection using a lower bandwidth capability. Accordingly, this slower connection speed should be taken into account when generating and adjusting data channels. Another example would be if one of the switches 316.1, 316.2, and 316.3 or storage controllers 312.1, 312.2, and 312.3 are implemented using an older computer device as compared to the other device. According to one or more examples, in some embodiments the performance change is not so much effected by distance, because the configurations can be rather uniform. According to other embodiments, the channel path IDs (CHPIDs), switch ports, and storage controllers can support different speeds. For example, if the CHPID supports 4 GB and the switch port 2 GB, it will auto-negotiate to 2 GB, which likely the CHPID can also handle.

Further, according to one or more embodiments, the paths to a device maybe considered to be shared. This is true whether the paths are channel path IDs (CHPIDs), switch ports, or host adapter ports on storage controller. When paths are shared they can be removed from the other users set of paths so that they are no longer share with them.

Additionally, the initial arrangement of the system 300 can change over time through the addition, removal, movement, replacement or usage of any one or more of the devices of the system 300. Accordingly, data channel assignment and adjustments can be done in response to any of these conditions using a firm channel (or dynamic channel).

Figure 3B:
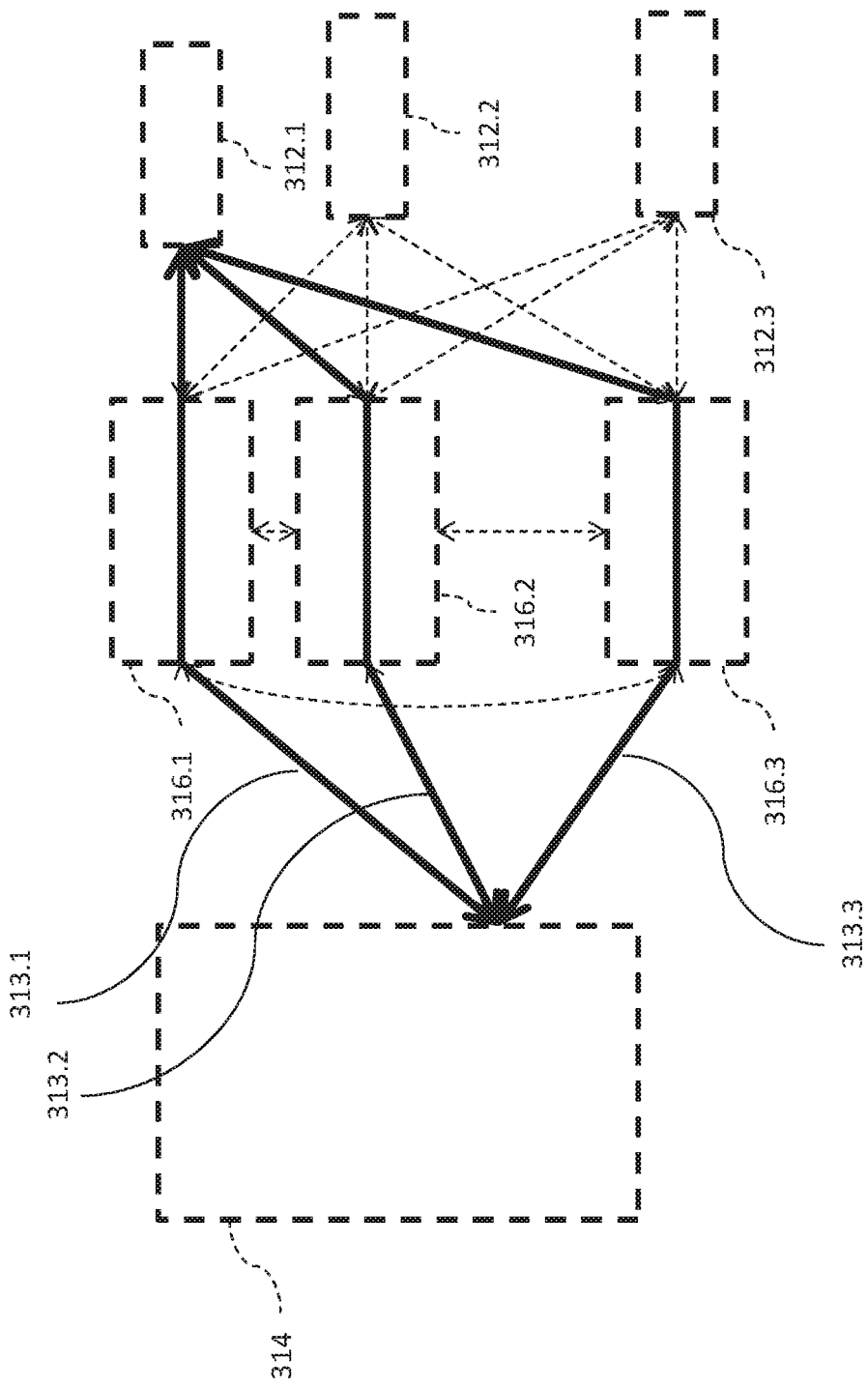
FIG. 3B is a block diagram of a system showing different channel paths for practice of the teaching herein in accordance with one or more embodiments of the present disclosure.

For example, FIG. 3B is a block diagram of a system showing different channel paths for practice of the teaching herein in accordance with one or more embodiments of the present disclosure. As shown, a firm channel 313.1 is provided that is configured to traverse from the host 314, through the switch 316.1, to the storage controller 312.1. Another firm channel 313.2 is shown that goes through switch 316.2 to connect with the storage controller 312.1. Further, another firm channel 313.3 is shown that traverses through switch 316.3 to connect with the storage controller 312.1.

According to one embodiment, these firm channels 313.1, 313.2, and 313.3 can represent a logical path that is configured over time to go through different switches to reach the same end result on a set architecture as shown. The logical path can include the CHPID (or channel path), the switch and the egress port of the switch (which effectively determines the host adapter, since one cable only has two ends, one in the switch and one in the storage controller). For example, the change may occur due to switch failure or switch traffic may increase from other traffic slowing it down thereby making a channel change helpful to maintain data flow at the desired rate and speed. Accordingly, the firm channel 313.1 may be moved to (or supplemented with) firm channel path 313.2 or 313.3. Further, each time the firm channel is moved to correspond to one of the firm channels 313.1, 313.2, and 313.3, this updated firm channel information is stored back to the configuration file. This storing back process can be called hardening the channel back to the configuration file.

According to one or more embodiments, as shown in FIG. 6, a limitation can be present that only allows for one to define eight paths to a device. These eight paths are often shared with several devices. If CHPIDs 01, 02, 03, A1, A2 and A3 could all access device 590 through the three unnumbered host adapters and if those same CHPIDs could access device C00 then clearly more than the limited eight paths could be made. Particularly, as shown in FIG. 6, there are actually more than eight ways for the host to access 590

(and C00); however often there are limitations that do not allow all physical connection paths to be used.

According to another embodiment, each firm channel 313.1, 313.2, and 313.3 may be distinct channels operating at a specific time concurrently. Further, according to other embodiments, additional firm channel arrangements are possible through any combination and arrangement to connect the host 314 with one of the storage controllers 312.1, 312.2, and 312.3.

Figure 4:
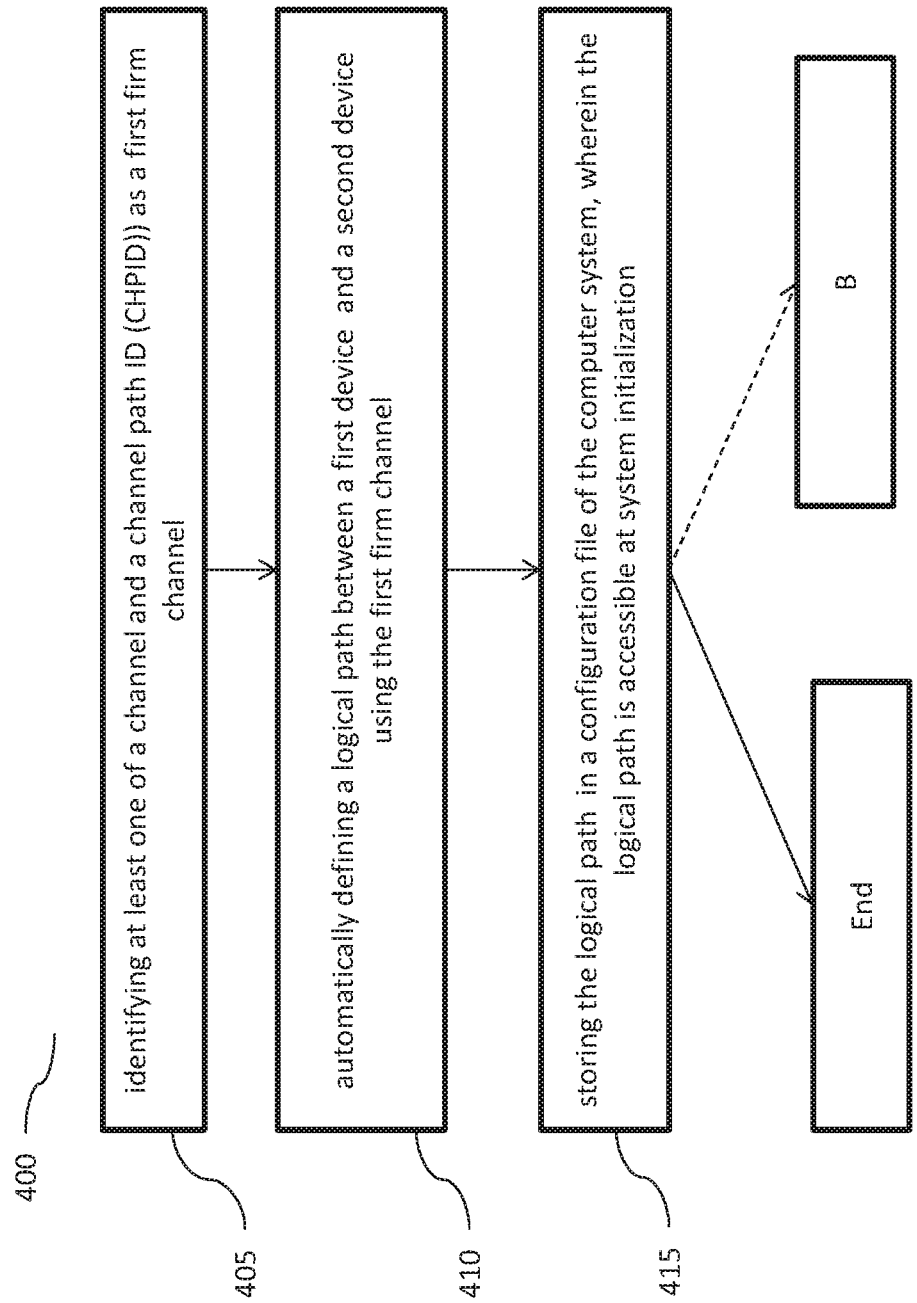
FIG. 4 is a flowchart of a method to implement a firm channel in accordance with one or more embodiments of the present disclosure.

FIG. 4 is a flowchart of a method 400 to implement a firm channel in accordance with one or more embodiments of the present disclosure. The method 400 includes identifying at least one of a channel and a channel path ID (CHPID) as a first firm channel (operation 405). Additionally, the method 400 includes automatically defining a logical path between a first device and a second device using the first firm channel (operation 410) Further the method 400 includes storing the logical path in a configuration file of the computer system, wherein the logical path is accessible at system initialization (operation 415).

Figure 5:
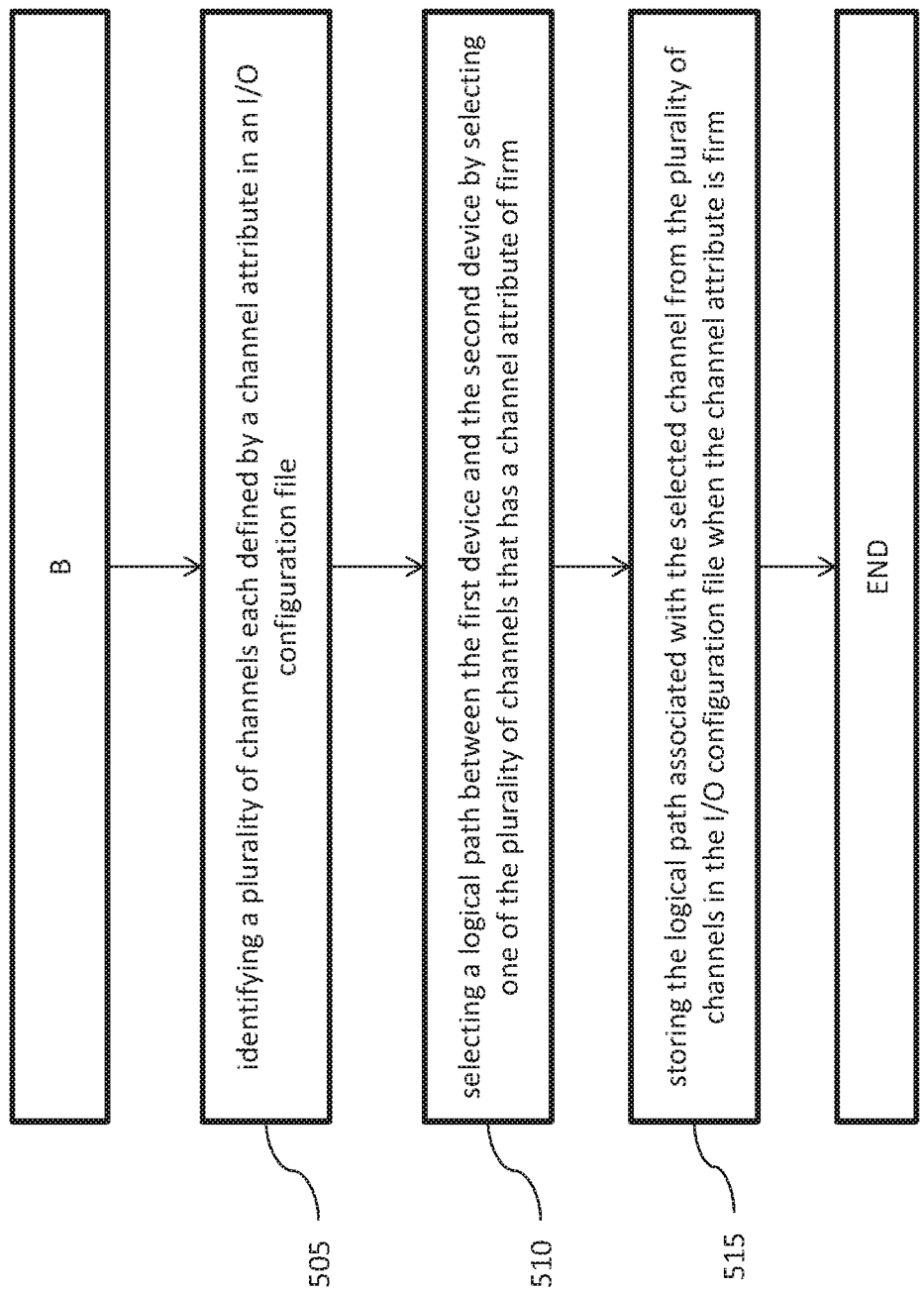
FIG. 5 is a flowchart of the method to implement a firm channel showing some additional operations in accordance with one or more embodiments of the present disclosure.

FIG. 5 is a flowchart of additional operations in accordance with one or more embodiments of the present disclosure. The additional operations include identifying a plurality of channels each defined by a channel attribute in an I/O configuration file (operation 505) and selecting a logical path between the first device and the second device by selecting one of the plurality of channels that has a channel attribute of firm (operation 510). Further, also included is storing the logical path associated with the selected channel from the plurality of channels in the I/O configuration file when the channel attribute is firm (operation 515).

According to one or more embodiments, the method can further include automatically defining the logical path between the first device and the second device using at least one of the first device and the second device includes selecting the first firm channel between the first device and the second device, selecting the logical path based on at least one of logical path properties and channel attributes, wherein logical path properties include one or more of bandwidth allocation, communication scheme, security scheme, password protection, and end user identification information, and wherein channel attributes include one or more of static, dynamic, and firm, combining the selected the first firm channel, logical path properties, and channel attributes to form a channel configuration, and forming the logical path based on the channel configuration.

According to one or more embodiments, the method can further include identifying a plurality of channels each defined by a channel attribute in an I/O configuration file, wherein each of the plurality of channels may provide a path from the first device to the second device, and wherein the channel attribute is at least one of static, dynamic, and firm, selecting a logical path between the first device and the second device by selecting one of the plurality of channels that has a channel attribute of firm, and storing the logical path associated with the selected channel from the plurality of channels in the I/O configuration file when the channel attribute is firm.

According to one or more embodiments, when the initial I/O configuration is made, dynamic channels may not be defined to provide a path to any specific device. In such an embodiment, the system will determine devices in need of additional bandwidth and dynamically assign the dynamic channels. Similarly, firm channels may start off unassigned in an initial configuration, but once the system assigns them, they will be defined in the updated IODF and/or IOCDS.

According to one or more embodiments, the method can further include wherein the first device is a host device, and wherein the second device is a storage controller. According to one or more embodiments, the method can further include collecting logical path properties from at least one of the first device and the second device, modifying the logical path based on the logical path properties, and storing the modified logical path in the configuration file. According to one or more embodiments, the method can further include reassigning the firm channel by the computer system in response to shifting workload patterns.

According to one or more embodiments, the method can further include wherein logical path properties include one or more of bandwidth allocation, communication scheme, security scheme, password protection, end user identification information, architecture, architecture adjustments, architecture limitations, switch availability, and workload patterns, wherein the method further includes considering the amount of bandwidth allocation when selecting the first firm channel and the logical path, considering the architectural limitations when selecting the first firm channel and the logical path, and considering the switch availability when selecting the first firm channel and the logical path such that a different switch is selected if a current switch is already in use for connecting the first device and the second device, thus providing a redundant path (or paths) to the device in the event of a switch failure.

According to one or more embodiments, the method can further include wherein the first device and the second device are each selected from a group consisting of a host and a storage controller, and wherein architecture adjustments include one or more of an addition of a host, addition of a switch, addition of a storage controller, removal of a host, removal of a switch, removal of a storage controller, removal of a logical path, removal of a channel, rearrangement of a host, rearrangement of a switch, rearrangement of a storage controller, replacement of a host, replacement of a switch, and replacement of a storage controller.

According to one or more embodiments, the method can further include automatically discovering the second device, wherein the second device is a storage controller, proposing a firm channel configuration to a user, receiving a user feedback to the proposed firm channel configuration, adjusting the proposed firm channel configuration based on the user feedback, modifying the logical I/O configuration based on the proposed firm channel configuration, and storing the logical I/O configuration as modified back into the configuration file of the system.

According to one or more embodiments, the method can further include generating a plurality of firm channels, wherein the plurality of firm channels include channel attributes, and storing one or more channels from the plurality of firm channels in the configuration file of the computer system that have a channel attribute of firm, wherein the one or more channels are accessible at system initialization. According to one or more embodiments, the method can further include collecting channel attributes for the plurality of firm channels, and modifying the plurality of channels based on the channel attributes of the plurality of channels.

According to one or more embodiments, the method can further include wherein modifying the logical path based on logical path properties includes confirming one or more modification requirements are met prior to modifying the logical path. According to one or more embodiments, the method can further include wherein the one or more modification requirements includes one or more of an allotted time having passed since previous modification, a confirmation that available dynamic channels were first modified to adjust for the logical path properties received. According to one or more embodiments, the method can further include periodic rebalancing of channel configuration of the firm channel, wherein the periodic rebalancing is done at an interval of one selected from a group consisting of hours, days, and months. According to one or more embodiments, the method can further include retrieving the firm channel from the configuration file at system startup.

According to other embodiments, channel configuration setting can include which channel path IDs (CHPIDs) to use to connect to which control units, how many paths one should have to each control unit and which host port adapters to use, and availability considerations, such as a propensity to spread multiple paths to the same control unit across different fiber channel switches.

According to other embodiments, a user can specify their desired number of static channels, firm channels, and dynamic channels. According to another embodiment, a user could choose only firm and dynamic channels, removing the requirement for customers to manage their I/O configuration. If the client chooses to make a channel firm, they are identifying it as a channel which they were not explicitly configuring and therefore it may be reconfigured or reassigned by the operating system (OS) such as for example using zDAC and DCM.

According to other embodiments, both static and firm channels can be written to the configuration file (referred to as IODF in the following examples and embodiment explanation but is not limited thereto) and identified there with their corresponding channel type (i.e. static, firm or dynamic). Furthermore, the IOCDS generated from the IODF will also contain that information.

Accordingly, one or more embodiments can provide automatic management such that static channels would no longer be necessary. Instead, firm channels can replace them, being selected and managed by the system in response to changing channel bandwidth requirements. The system can attempt to allocate firm channels such that the channel bandwidth needs projected for the system will be achieved without the need for further changes to the I/O configuration, including both dynamic and static channels. Dynamic channels would thereby be expected to be used (or reconfigured) only to address unforeseen channel demand or temporary variations in workload.

For example, according to an embodiment, when DCM runs, if changes are necessary in order for work to continue to achieve its service level agreement (SLA) goals, it will first attempt to do that by reconfiguring dynamic channels, if they are available.

If it is unable to achieve the SLA goals restricting itself to dynamic channels, it will then look to the firm channels and reconfigure those. However, any changes made to firm channels will be written to the IOCDS and optionally the IODF. In this way, the new configuration is "hardened" for the next IPL of a system, or even an IML of the machine.

According to other embodiments, changes to the firm channel configuration may also be made periodically in response to changing needs. For example, the system can periodically examine its I/O configuration to assure that it continues to be an efficient allocation of resources, and revalue the I/O configuration and change the configuration to better address the evolving needs of the system by adjusting the firm channels.

When the system decides to change a firm channel, it will update the I/O configuration in the currently active production IODF, activate that change, and replace the existing IOCDS in an atomic fashion, such that a failure during the update does not corrupt the IOCDS. By replacing the existing IOCDS, there is no need to switch the IOCDS for the next POR. The changes will be activated using CHSCs and then the IODF will be modified so that it represents the new configuration.

According to one or more embodiments, a client can create a "Work IODF", and in response an existing "Production IODF" will be used as the starting point for the firm channel adjustments. For example, because all changes made by the system have been reflected in the active production IODF, if the active production IODF is used, it will represent the current configuration at the time the work IODF was created. In order to serialize access to the production IODF, any time the system changes it; it will first acquire exclusive access to the IODF. When a work IODF is generated from the production IODF, HCD will first acquire shared access to the IODF, thus preventing HCD from copying the production IODF while it is being modified by another user. Serialization may be performed using DASD RESERVE or any other suitable means.

Further, when the work IODF is converted into a production IODF, it will be compared against the currently active production IODF to determine if there is anything that is incompatible with new IODF. This might occur if the work IODF was generated using the then active production IODF, and because then a change has been made such that the work IODF is no longer compatible. If there are no incompatibilities between the two, then the work IODF is converted into a production IODF. If there are incompatibilities, then the client will have to modify the work IODF so that it is no longer inconsistent and attempt to convert it into a production IODF again.

When a work IODF is converted into a production IODF that does not necessarily mean that the resulting production IODF is going to be activated immediately. Therefore when a production IODF is activated we need to compare the active IODF and the new IODF being activated. If there are no incompatibilities between the two, then the existing active production IODF configuration will be used to make changes to the current configuration so that it matches the newly activated IODF. If there are incompatibilities, then the client will either have to modify the work IODF so that it is no longer inconsistent and attempt to convert it into a production IODF and attempt to activate it again, override the incompatibility or make a change on the system. For example, in order to change channel attributes between static, firm and dynamic, the client may need to first configure the channel offline.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of implementing a firm channel in a computer system, the method comprising:
   identifying at least one of a channel and a channel path ID (CHPID)) as a first firm channel, a firm channel comprising a channel that may only be reassigned when one or more dynamic channels are unable to meet a specified workload goal, wherein reassignment of the firm channel is limited by a predetermined time interval such that the firm channel is restricted from being reassigned during the predetermined time interval and the firm channel can be reassigned at any time after an expiration of the predetermined time interval;
   automatically defining a logical path between a first device and a second device using the first firm channel, wherein the first device is a host, the second device is a storage controller and automatically defining the logical path comprises selecting the logical path based on logical path properties, the logical path properties comprising one or more of communication scheme, security scheme, password protection and end user information; and
   storing the logical path in a configuration file of the computer system, wherein the logical path is accessible at system initialization for an initial program load and the configuration file comprises at least one of an input/output definition file and input/output configuration data sets, and wherein a frequency of modifying the configuration file to change the logical path is limited by the predetermined time interval, the configuration file being associated with the firm channel, the predetermined time interval being defined to cause the configuration file to be changed less frequently than the one or more dynamic channels.

2. The method of claim 1, wherein automatically defining the logical path between the first device and the second device using at least one of the first device and the second device comprises:
   selecting the first firm channel between the first device and the second device;
   wherein logical path properties further include bandwidth allocation, and
   wherein channel attributes include one or more of static, dynamic, and firm;
   combining the selected the first firm channel, logical path properties, and channel attributes to form a channel configuration; and
   forming the logical path based on the channel configuration.

3. The method of claim 1, further comprising:
   identifying a plurality of channels each defined by a channel attribute in an I/O configuration file,
   wherein each of the plurality of channels provide a path from the first device to the second device, and
   wherein the channel attribute is at least one of static, dynamic, and firm;
   selecting a logical path between the first device and the second device by selecting one of the plurality of channels that has a channel attribute of firm; and
   storing the logical path associated with the selected channel from the plurality of channels in the I/O configuration file when the channel attribute is firm.

4. The method of claim 1, wherein the first device is a host device; and
   wherein the second device is a storage controller.

5. The method of claim 1, further comprising:
   collecting logical path properties from at least one of the first device and the second device;
   modifying the logical path based on the logical path properties; and
   storing the modified logical path in the configuration file.

6. The method of claim 1, further comprising:
   reassigning the firm channel by the computer system in response to shifting workload patterns.

7. The method of claim 1, wherein logical path properties further include one or more of bandwidth allocation, architecture, architecture adjustments, architecture limitations, switch availability, and workload patterns, and
   wherein the method further comprises:
      considering the amount of bandwidth allocation when selecting the first firm channel and the logical path;
      considering the architectural limitations when selecting the first firm channel and the logical path; and
      considering the switch availability when selecting the first firm channel and the logical path such that a different switch is selected if a current switch is already in use for connecting the first device and the second device.

8. The method of claim 7, wherein architecture adjustments include one or more of an addition of a host, addition of a switch, addition of a storage controller, removal of a host, removal of a switch, removal of a storage controller, removal of a logical path, removal of a channel, rearrangement of a host, rearrangement of a switch, rearrangement of a storage controller, replacement of a host, replacement of a switch, and replacement of a storage controller.

9. The method of claim 1, further comprising:
   automatically discovering the second device;
   proposing a firm channel configuration to a user;
   receiving a user feedback to the proposed firm channel configuration;

adjusting the proposed firm channel configuration based on the user feedback;
modifying the logical I/O configuration based on the proposed firm channel configuration; and
storing the logical I/O configuration as modified back into the configuration file of the system.

10. The method of claim 1, further comprising:
generating a plurality of firm channels, wherein the plurality of firm channels include channel attributes; and
storing one or more channels from the plurality of firm channels in the configuration file of the computer system that have a channel attribute of firm, wherein the one or more channels are accessible at system initialization.

11. The method of claim 10, further comprising:
collecting channel attributes for the plurality of firm channels; and
modifying the plurality of channels based on the channel attributes of the plurality of channels.

12. The method of claim 5, wherein modifying the logical path based on logical path properties comprises:
confirming one or more modification requirements are met prior to modifying the logical path.

13. The method of claim 12, wherein the one or more modification requirements includes one or more of an allotted time having passed since previous modification, a confirmation that available dynamic channels were first modified to adjust for the logical path properties received.

14. The method of claim 1, further comprising:
periodic rebalancing of channel configuration of the firm channel,
wherein the periodic rebalancing is done at an interval of one selected from a group consisting of hours, days, and months.

15. The method of claim 1, further comprising:
retrieving the firm channel from the configuration file at system startup.

16. A system that includes a firm channel, the system comprising:
a first device that is connected to a second device through a plurality of network resources that include one or more switches and links, wherein the links are selected from one or more of a fiber optic cable, a wireless communication system, an Ethernet cable, and a coaxial cable, wherein the first device is a host and the second device is a storage controller; and
a firm channel that comprises a logical path from the first device to the second device through some of the plurality of network resources, the firm channel comprising a channel that may only be reassigned when one or more dynamic channels are unable to meet a specified workload goal, wherein reassignment of the firm channel is limited by a predetermined time interval such that the firm channel is restricted from being reassigned during the predetermined time interval and the firm channel can be reassigned at any time after an expiration of the predetermined time interval,
wherein the logical path can be changed by the computer system automatically by selecting the logical path based on logical path properties, wherein the logical path properties comprise one or more of communication scheme, security scheme, password protection and end user information, and
wherein at least one of the logical path and the firm channel is stored back into a configuration file such as to be accessible at system initialization for an initial program load, wherein the configuration file comprises at least one of an input/output definition file and input/output configuration sets, and wherein a frequency of modifying the configuration file to change the logical path is limited by the predetermined time interval the configuration file being associated with the firm channel, the predetermined time interval being defined to cause the configuration file to be changed less frequently than the one or more dynamic channels.

17. A computer program product to implement a firm channel in a computer system, the computer program product comprising a computer readable storage medium having program instructions embodied therewith, the program instructions executable by a processor to cause the processor to:
identify at least one of a channel and a channel path ID (CHPID)) as a first firm channel, a firm channel comprising a channel that may only be reassigned when one or more dynamic channels are unable to meet a specified workload goal, wherein reassignment of the firm channel is limited by a predetermined time interval such that the firm channel is restricted from being reassigned during the predetermined time interval and the firm channel can be reassigned at any time after an expiration of the predetermined time interval;
automatically define a logical path between a first device and a second device using the first firm channel, wherein automatically defining the logical path comprises selecting the logical path based on logical path properties, the logical path properties comprising one or more of communication scheme, security scheme, password protection and end user information, wherein the first device is a host and the second device is a storage controller; and
store the logical path in a configuration file of the computer system, wherein the logical path is accessible at system initialization for an initial program load and the configuration file comprises at least one of an input/output definition file and input/output configuration data sets, and wherein a frequency of modifying the configuration file to change the logical path is limited by the predetermined time interval, the configuration file being associated with the firm channel, the predetermined time interval being defined to cause the configuration file to be changed less frequently than the one or more dynamic channels.

18. The computer program product of claim 17, having additional program instructions embodied therewith, the additional program instructions executable by a processor to cause the processor to:
identify a plurality of channels each defined by a channel attribute in an I/O configuration file,
wherein each of the plurality of channels provide a path from the first device to the second device, and
wherein the channel attribute is at least one of static, dynamic, and firm;
select a logical path between the first device and the second device by selecting one of the plurality of channels that has a channel attribute of firm; and
store the logical path associated with the selected channel from the plurality of channels in the I/O configuration file when the channel attribute is firm.

* * * * *